(12) United States Patent
Cagnol et al.

(10) Patent No.: US 8,293,309 B2
(45) Date of Patent: Oct. 23, 2012

(54) FROZEN AERATED CONFECTIONS AND METHODS FOR PRODUCING THEM

(75) Inventors: Florence Clotilde Cagnol, London (GB); Andrew Richard Cox, Sharnbrook (GB); Andrew Baxter Russell, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 279 days.

(21) Appl. No.: 12/632,246

(22) Filed: Dec. 7, 2009

(65) Prior Publication Data

US 2010/0143566 A1 Jun. 10, 2010

(30) Foreign Application Priority Data

Dec. 9, 2008 (EP) .................................. 08171054

(51) Int. Cl.
A23G 9/00 (2006.01)

(52) U.S. Cl. ........................ 426/565; 426/100

(58) Field of Classification Search .................. 426/565, 426/100

See application file for complete search history.

(56) References Cited

U.S. PATENT DOCUMENTS

| 5,082,682 | A | | 1/1992 | Peterson |
| 5,215,776 | A | | 6/1993 | Peterson |
| 5,397,577 | A | * | 3/1995 | Le Magnen et al. ........... 424/535 |
| 5,472,726 | A | * | 12/1995 | Bee et al. ...................... 426/565 |
| 2005/0037110 | A1 | | 2/2005 | Windhab et al. |
| 2006/0280802 | A1 | | 12/2006 | Campbell et al. |

FOREIGN PATENT DOCUMENTS

| EP | 1568377 A1 | 8/2005 |
| EP | 1709875 A1 | 10/2006 |
| EP | 1917865 A1 | 5/2008 |
| WO | WO 94/12050 | 6/1994 |
| WO | WO 96/29340 | 9/1996 |
| WO | WO 98/09534 | 3/1998 |
| WO | WO 98/09536 | 3/1998 |
| WO | WO 98/18350 | 7/1998 |

OTHER PUBLICATIONS

International Search Report International Application No. PCT/EP2009/065212.
Huppertz et al., "A method for the large-scale isolation of β-casein", Food Chemistry 99 (2006), pp. 45-50.
Zhang et al., "On fat destabilization and composition of the air interface in ice cream containing saturated and unsaturated monoglyceride", International Dairy Journal 15 (2005), pp. 495-500.
Chang et al., "Casein Micelles Partially Hydrolyzed by Chymosin to Modify the Texture of Lowfat Ice Cream", Journal of Dairy Science, 78 (1995), No. 12, pp. 2617-2623, XP000580304.
Dauphas et al., "The supramolecular organization of β-casein: effect on interfacial properties", Food Hydrocolloids 19 (2005), pp. 387-393.

* cited by examiner

*Primary Examiner* — Jyoti Chawla
(74) *Attorney, Agent, or Firm* — Gerard J. McGowan, Jr.

(57) ABSTRACT

A frozen aerated confection is provided, the confection comprising at least 0.2 wt % free β-casein, wherein the free β-casein constitutes more than 45% of the total β-casein present in the frozen confection; and containing a population of gas bubbles, wherein at least 65% of the gas bubbles have a diameter of less than 20 μm. A process for producing such a frozen aerated confection is also provided.

8 Claims, 1 Drawing Sheet

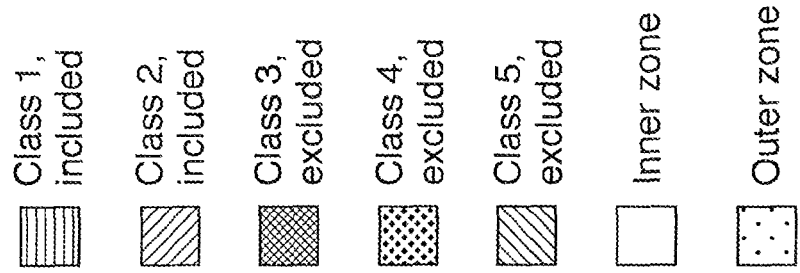
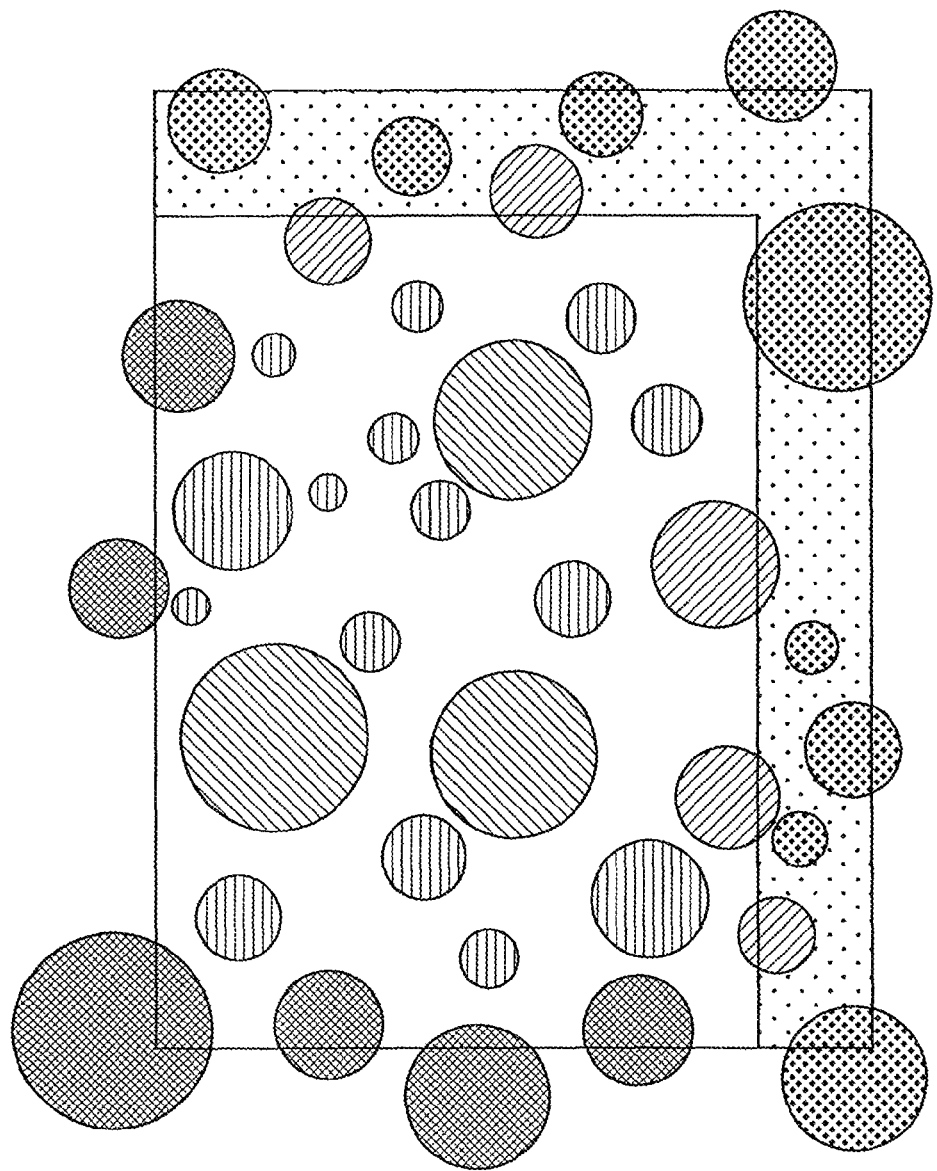

FROZEN AERATED CONFECTIONS AND METHODS FOR PRODUCING THEM

TECHNICAL FIELD OF THE INVENTION

The present invention relates to frozen aerated confections and methods for producing them. In particular it relates to frozen aerated confections containing small gas bubbles.

BACKGROUND TO THE INVENTION

Frozen aerated confections, such as ice cream, sorbet and frozen yoghurt contain many gas bubbles, typically 50 µm in diameter. The effectiveness of the gas bubbles is related to their size: generally, the smaller the bubbles, the smoother and creamier the texture. However, it is difficult to create and preserve gas bubbles with sizes of less than about 50 µm. This is because a dispersion of gas bubbles is vulnerable to coarsening by creaming, coalescence and disproportionation, resulting in fewer, larger bubbles. The smaller the gas bubbles (for a given total gas volume), the greater the driving force for coarsening.

EP 0 675 685 discloses frozen aerated confections containing gas bubbles having a D(3,2) average size of less than 20 µm, prepared by using sucrose esters. WO 98/09536 discloses a process for preparing frozen aerated confections having gas bubbles of less than 40 µm, by subjecting the product to shear forces and cooling in a screw extruder. US 2005/0037110 discloses ice cream which is mechanically treated by means of mechanical tools which generate large shear stresses, resulting in gas bubbles having a mean diameter of not more than 10 µm.

However, these routes require specialized ingredients or complex processing methods. Therefore, there remains a need for an improved, simple method for producing frozen aerated confections containing small gas bubbles.

BRIEF DESCRIPTION OF THE INVENTION

We have now found that it is possible to prepare frozen aerated confections which contain a substantial proportion of very small gas bubbles by using β-casein. Accordingly, in a first aspect, the present invention provides a frozen aerated confection comprising at least 0.2 wt % free β-casein, wherein the free β-casein constitutes at least 45% of the total β-casein present in the frozen confection; and containing a population of gas bubbles, wherein at least 65% of the gas bubbles have a diameter of less than 20 µm.

Preferably at least 50% of the gas bubbles have a diameter of less than 10 µm.

Preferably the amount of free β casein is at least 0.3 wt %, more preferably at least 0.5%, even more preferably at least 0.7%, most preferably at least 1.0%.

Preferably the free β-casein constitutes at least 50%, more preferably at least 55%, most preferably at least 60% of the total β-casein present in the frozen confection.

Preferably the frozen aerated confection has an overrun of from 20% to 400%.

Preferably the frozen aerated confection is ice cream, sorbet and frozen yoghurt, most preferably ice cream.

In a second aspect the present invention provides a process for producing an aerated food product according to the first aspect of the invention, the process comprising:
a) providing a mixture of ingredients comprising at least 0.2 wt % free β-casein, wherein the free β-casein constitutes more than 45% of the total β-casein present in the frozen confection;
b) aerating the mixture so that a population of gas bubbles is formed, wherein at least 65% of the gas bubbles have a diameter of less than 20 µm;
c) freezing the mixture;
wherein steps b) and c) may take place simultaneously or in either order Preferably the mixture of ingredients comprises an isolated, purified or partially purified, enriched or concentrated source of β-casein.

DETAILED DESCRIPTION OF THE INVENTION

Unless defined otherwise, all technical and scientific terms used herein have the same meaning as commonly understood by one of ordinary skill in the art (e.g. in frozen confectionery manufacture). Definitions and descriptions of various terms and techniques used in frozen confectionery manufacture are found in "Ice Cream", $6^{th}$ Edition, Robert T. Marshall, H. Douglas Goff and Richard W. Hartel (2003), Kluwer Academic/Plenum Publishers. All percentages, unless otherwise stated, refer to the percentage by weight, with the exception of percentages cited in relation to the overrun (which are defined by the equation below) and percentages cited in relation to the bubble size distribution (which refer to the normalised cumulative frequency).

The term "frozen confection" means a sweet-tasting fabricated foodstuff intended for consumption in the frozen state (i.e. under conditions wherein the temperature of the foodstuff is less than 0° C., and preferably under conditions wherein the foodstuff comprises significant amounts of ice). Frozen confections include ice cream, sorbet, sherbet, frozen yoghurt and the like.

The term "aerated" means that gas has been intentionally incorporated into a mix, for example by mechanical means. The gas can be any gas, but is preferably, in the context of food products, a food-grade gas such as air, nitrogen, nitrous oxide, or carbon dioxide. The extent of aeration is measured in terms of "overrun", which is defined as:

$$\text{overrun} = \frac{\text{weight of mix} - \text{weight of aerated product}}{\text{weight of aerated product}} \times 100$$

where the weights refer to a fixed volume of product/mix. Overrun is measured at atmospheric pressure. Preferably the frozen confection has an overrun of at least 20%, more preferably at least 50%, most preferably at least 80%. Preferably the frozen confection has an overrun of at most 400%, more preferably at most 200%, most preferably at most 120%.

Cows' milk contains about 87% water. The remainder consists of fat (4%), proteins (3.5%), lactose (4.8%) and small quantities of inorganic salts, notably calcium and phosphate (0.29%). Milk proteins are divided in to two main types: casein (80%) and whey proteins (20%). Casein and whey proteins are distinguished by their solubility at pH 4.6 (at 20° C.): caseins are insoluble, whereas whey proteins are soluble. The caseins are mostly present in the form of colloidal particles which are typically 100 nm in size, known as casein micelles. The natural function of casein micelles is to carry the insoluble calcium phosphate which is needed by mammalian young. Casein micelles tend to lose their structure when subjected to enzymatic treatment or pH reduction to 4.6. On a microstructural level, milk can be considered as three components: fat globules, casein micelles and serum (whey). There is some free casein in the milk serum, since there is a dynamic equilibrium between the micellar casein and the free casein. Free serum casein can be separated from casein micelles by centrifugation.

The major whey proteins are β lactoglobulin, α-lactalbumin, bovine serum albumin, immunoglobulin and proteose peptones. There are also several minor proteins (lysozyme, glycoprotein, lactotransferrin, lactoperoxidase). There are 4 main casein proteins: $\alpha_{s1}$, $\alpha_{s2}$, β and κ casein. Caseins are relatively small protein molecules which are highly surface active, because one end of the molecules consists mostly of hydrophilic amino acids (such as serine and glutamic acid) whereas the other consists mostly of hydrophobic ones (for example leucine, valine and phenylalanine). Caseins are quite stable to heat denaturation, but they can be denatured by excessive heat, leading to aggregation and precipitation.

β-casein makes up approximately 33% of total casein. β casein contains many proline residues which confer a disordered or random coil structure with little secondary structure (α helix<10%). β-casein is very amphiphilic because of the net separation between hydrophobic clusters and negatively charged regions along the peptide chain. It is also the most hydrophobic casein protein. Its structure results in 3 important physico-chemical properties. Firstly, β-casein is one of the most surface active milk proteins. It adsorbs quickly at the air or oil/water interfaces but does not form a rigid network at the interface (e.g. compared to β lactoglobulin). Secondly, heat has little effect on β-casein as it has already an open and extended form. Thirdly, β-casein tends to self associate in solution in a similar way to an ionic detergent. Its self association is highly dependant on the ionic strength and the temperature.

Milk-based frozen confections containing β casein together with the other caseins and whey proteins are of course well known. However, these products do not contain significant amounts of free β casein. The term "free β casein" refers to β casein not present in casein micelles, i.e. not associated with any other types of casein ($\alpha_{s1}$, $\alpha_{s2}$, κ). Depending on the temperature, free β casein is either found in the serum as a monomer or as self-associated β casein micelles. These β casein micelles do not contain any of the other caseins and are therefore encompassed within the term "free β casein". The free β casein concentration is measured from the supernatant obtained after centrifugation according to the method described below. The term "bound β casein" refers to β casein which is present in the casein micelle. Its concentration can be measured by analysing the precipitate formed after centrifugation. The "total β casein" is the sum of the free β casein and bound β casein. The amount of free β casein is essentially the amount of non-micellar β casein incorporated in the mix from which the frozen confection is made, although (as explained above) a small amount of free β casein is present together with casein micelles in sources of milk protein such as skim milk powder. For example, using the method described below, we have determined that in a typical skim milk powder, the amount of free β casein is 16% of the total β casein.

In order to determine the amounts of free and bound β casein, samples of melted, degassed ice cream are prepared for centrifugation as follows. Transparent plastic tubes (39 mL) are completely filled with melted ice cream or protein solution using a syringe, accurately weighed and sealed. Care must be taken when filling the tubes to avoid foaming. Samples are centrifuged at 50 000 rpm for 2 hours at 5° C. using a Beckman L8-M ultracentrifuge with a Ti-70 rotor. After centrifugation, the supernatant is separated by filtration from the precipitate and both are weighed into pre-weighed glass vials, and then freeze-dried until completely dry. The glass vials are then re-weighed to determine the total amount of freeze-dried material. Approximately 30 mg of freeze dried material is accurately weighed into glass vials and then dissolved in 2 ml of reducing dissolution buffer (consisting of 147 mg trisodium citrate dehydrate, 100 mg dithiothreitol and 36 g urea in 100 ml MilliQ water). The protein composition in the supernatant and precipitate is then determined by capillary electrophoresis (CE), using a Hewlett Packard $HP^{3D}$ Capillary Electrophoresis System using an eCAP™ N-CHO coated capillary, 50 μm internal diameter and 65 cm total length (obtained from Beckman Coulter). The method is based on that described in: "Determination of milk proteins by capillary electrophoresis", N. de Jong, S. Visser and C. Olieman, J. Chromatogr. A, 652 (1993) page 207. The CE analysis buffer is prepared by dissolving 147 mg trisodium citrate dihydrate, 1.7 g citric acid monohydrate and 18 g urea in 50 ml MilliQ water, and adjusting the pH to 3.0 by adding citric acid monohydrate. 25 mg hydroxymethylethyl cellulose is then dissolved in this solution (this may take several hours). The analysis buffer is filtered through a 0.2 μM membrane filter. Samples are quantified by comparison with a β-Casein standard calibration graph. All experiments are done in duplicate to ensure reproducibility.

We have found that aerating and freezing a mixture containing β-casein results in frozen aerated confections which contain very small gas bubbles. Without wishing to be limited by theory, it is believed that these small bubbles are created because of the high surface activity of β-casein, and also, because β-casein appears to dramatically slow down disproportionation in frozen aerated confections. However, when bound β-casein is also present (e.g. in the form of casein micelles), a competition for the gas interface exists, usually resulting in a mixture of species at the surface of the gas bubbles. In these circumstances, free β-casein is less effective at stabilising the bubbles against disproportionation. It is also believed that the β-casein interacts with the casein micelle and therefore there is less free β casein is available for the interface.

We have now found that this competition effect can be overcome when a mix (i.e. an aqueous solution and/or suspension) containing at least 0.2 wt % free β-casein in which the free β-casein constitutes more than 45% of the total β-casein present is aerated. Thus large numbers of small gas bubbles can be formed, i.e. at least 65% of the gas bubbles have a diameter of less than 20 μm, as measured by the method described in the examples below. Preferably at least 75%, more preferably at least 80% of the gas bubbles have a diameter of less than 20 μm. Preferably at least 50%, more preferably at least 60%, most preferably at least 75% of the gas bubbles have a diameter of less than 10 μm. The aeration step must be of a sufficiently high "intensity" so that a large number of very small gas bubbles are created. The intensity of the aeration process depends on a number of factors, the most important of which are the rate of energy dissipation in the aeration step, the nature of the flow experienced by the mix and the gas bubbles in the aeration step, and the viscosity and temperature of the mix. In addition, the aeration step should be long enough to achieve the desired degree of aeration (i.e. overrun). Freezing may take place simultaneously with aeration, for example in a scraped surface heat exchanger. Simultaneous freezing and aeration can aid the formation of small gas bubbles because of the increase in the mix viscosity as ice forms. If freezing takes place after aeration, it is preferably carried out so that little or no further gas is incorporated.

Partial freezing may take place before aeration, but the mix must not be frozen to such an extent that it is too viscous to then be aerated.

Preferably the β casein is provided in an isolated, purified, enriched or concentrated form. A method for the large-scale isolation of β casein is described in *Food Chemistry* vol. 99 (2006), pages 45-50. Alternatively it could be provided as milk, milk powder, milk concentrate or any form of caseinate which is enriched in β casein. β casein is found not only in bovine milk, but also in other mammalian milk, for example goat, sheep, buffalo or camel milk. β casein from any milk source can be used in the frozen confections of the invention.

The frozen aerated confections may also contain other proteins. Suitable sources of milk protein include caseinates, such as sodium caseinate; whey, whey powders and whey protein concentrates/isolates; sources of milk protein which contain casein micelles (e.g. e.g. whole, skimmed or semi-skimmed milk, milk powders, milk concentrates, cream and yoghurt) may also be used provided that the ratio of free p casein to total β casein is at least the minimum value specified. Non-milk proteins, such as soy protein may also be used. In one embodiment, the frozen confection has a total protein content of from 1 to 8 wt %, more preferably from 2 to 5 wt %. Ice creams, frozen yoghurts and sherbets typically contain protein in these amounts. In another embodiment, the frozen aerated confection is a sorbet-type product which contains less than 1 wt % protein.

Since β casein is very effective at producing small bubbles, other aerating agents, such as hydrophobins and sucrose esters, are not required. Thus in one embodiment, the frozen aerated confection does not contain hydrophobin. In another embodiment, the frozen aerated confection does not contain sucrose ester.

The frozen aerated confections may comprise fat. Preferably the frozen composition has a fat content of at least 2%, preferably at least 4%, more preferably at least 7%; and at most 20%, preferably at most 15%, more preferably at most 12%. Suitable fats include, but are not limited to dairy fat, coconut oil, palm oil and sunflower oil.

The frozen aerated confections may also comprise emulsifier (such as mono- and di-glycerides of saturated or unsaturated fatty acids, lecithin and egg yolk) and/or stabiliser (such as locust bean gum, guar gum, agar, alginates, carrageenan, pectin, carboxymethyl cellulose, microcrystalline cellulose, dextran and xanthan). Preferably the emulsifier and stabiliser are each present at a level of 0.05 to 1% by weight of the frozen confection. In addition, the frozen aerated confections may contain flavouring and/or colouring. Pieces of chocolate, nut, ginger, biscuit, fruit, fruit puree and the like may also be included.

After the freezing and aeration steps, the ice content may be increased further by subsequent freezing operations, such as low-temperature extrusion, quiescent freezing in a mould, dropping portions of the aerated mixture directly into a bath of cryogenic fluid such as liquid nitrogen or placing a container containing the aerated mixture into a cold environment such as a blast freezer, hardening tunnel or cold store. The subsequent freezing step is preferably carried out at low or zero shear rate so that little or no further gas is incorporated.

The present invention will now be further described with reference to the following examples which are illustrative only and non-limiting, and the figures wherein:

FIG. 1 shows a schematic depiction of a micrograph illustrating the guard frame concept.

EXAMPLES

Example 1

Sherbets

Sherbet-type frozen aerated confections were prepared using the formulations given in Table 1.

TABLE 1

| Ingredient (wt %) | A | B |
| --- | --- | --- |
| Skim milk powder | 7.14 | 7.14 |
| β-casein | 1.5 | 1.0 |
| Sucrose | 22.0 | 22.0 |
| Xanthan gum | 0.2 | 0.2 |
| Water | To 100 | To 100 |

Skim milk powder (SMP) contained approximately 35% protein, 0.8% fat, 3.7% moisture and was obtained from United Milk, UK. Xanthan gum (Keltrol RD cold dispersible) was obtained from CP Kelco. β-casein was obtained from Sigma-Aldrich and contained >90% protein.

First the dry ingredients were blended together and then added to water at room temperature while stirring. The solution was pasteurised by holding at 82° C. for 5 minutes and then cooled to 5° C. and stored for two hours.

Next, 80 ml (approximately 90 g) of each mix was sheared and frozen simultaneously in a "stirred pot". The stirred pot is a cylindrical, vertically mounted, jacketed stainless steel vessel with internal dimensions of height 105 mm and diameter 72 mm. The lid fills a large portion of the vessel leaving a working volume of 160 ml. The rotor used to shear the sample consists of a rectangular impeller of the correct dimensions to scrape the inside surface of the vessel as it rotates (72 mm×41.5 mm). Also attached to the rotor are two semi-circular (60 mm diameter) high-shear blades positioned at a 45° angle to the rectangular impeller. The vessel is surrounded by a jacket through which an ethylene glycol coolant can be flowed. The flow of coolant through the jacket is turned on and off by a valve in the coolant supply line that diverts the flow. A platinum resistance probe is mounted in the lid to allow measurement of the mix temperature during processing. A shaft-mounted torque meter allows the increase of the mix viscosity during freezing to be monitored.

Using this device the mix was sheared by rotating the impeller in order to incorporate air. Simultaneously, the coolant was pumped around the container jacket to cool and freeze the mix. The impeller also scraped the inside wall, removing the ice that formed there and incorporating this into the rest of the mix. The following process conditions were used. The coolant (−18° C.) was circulated as soon as shearing started with the impellor at an initial speed of 100 rpm for 1 minute. Then the rotational speed was increased to 1000 rpm for a further 2 minutes to aerate the mix. The rotational speed was then lowered to 300 rpm to allow greater cooling and freezing. When the product temperature had reached about −5° C. to −6° C. and the final shaft torque was approximately 1 Nm, the coolant circulation and the impellor were stopped. This took about 4 to 5 minutes. Finally, the product was removed from the vessel and its overrun was measured by weighing a known volume of product.

Samples of approximately 15 g were placed into small pots, cooled in dry ice for 20 minutes then stored in a freezer at −80° C. prior to microscopy analysis.

The amounts of free and total β casein in products A and B were determined by the method described above (for B, a model solution with the same protein composition was used rather than a sample of the frozen confection). These were compared with the expected amounts estimated from the formulation on the following basis: skim milk powder contains 35% protein, 80% of which is casein; 33% of this 80% is β casein; the source of free 6 casein contains 90% β casein. The amounts are given in Table 2.

TABLE 2

|  | A | B |
| --- | --- | --- |
| Skim milk powder (wt % of frozen confection) | 7.14 | 7.14 |
| Total protein from SMP (wt %) | 2.50 | 2.50 |
| Total casein from SMP (wt %) | 2.00 | 2.00 |
| Bound β casein from SMP (wt %) | 0.67 | 0.67 |
| Source of free β casein (wt % of frozen confection) | 1.50 | 1.0 |
| Free β casein (wt %) | 1.35 | 0.9 |
| Estimated free β casein/total β casein (%) | 67 | 58 |
| Measured free β casein/total β casein (%) | 55 | 40 |

The estimated and measured ratios of free/total β casein differ because the estimation ignores the dynamic equilibrium between the free β casein and the bound β casein in the micelles. Thus in reality there is somewhat less free β casein present than estimated.

Scanning Electron Microscopy

The microstructure of each product was visualised using Low Temperature Scanning Electron Microscopy. Each sample was cooled to −80° C. on dry ice, and a section, approximately 5 mm×5 mm×10 mm in size, was cut out and mounted on a sample holder using a Tissue Tek: OCT™ compound (PVA 11%, Carbowax 5% and 85% non-reactive components). The sample including the holder was plunged into liquid nitrogen slush and transferred to a low temperature preparation chamber (Oxford Instruments CT1500HF). The chamber was held under vacuum, approximately $10^{-4}$ bar. The sample was warmed up to −90° C. for 60 to 90 seconds, thereby slowly etching the ice in order to reveal surface detail not caused by the ice itself. The sample was then cooled to −110° C. and coated with gold using argon plasma with an applied pressure of $10^{-1}$ millibars and current of 6 milliamps for 45 seconds. The sample was finally transferred to a conventional scanning electron microscope (JSM 5600), fitted with an Oxford Instruments cold stage held at a temperature of −160° C. The sample was examined and representative areas were captured via digital image acquisition software Quantification of Gas Bubble Size Distributions The gas bubble size (diameter) distribution as used herein is defined as the size distribution obtained from the two dimensional representation of the three dimensional microstructure, as visualized in the SEM micrograph, determined using the following methodology.

Samples are imaged at 3 different magnifications (for reasons explained below), and the bubble size distribution of a sample is obtained from this set of micrographs in three steps:
1. Identification and sizing of the individual gas bubbles in the micrographs;
2. Extraction of the size information from each micrograph;
3. Combination of the data from the micrographs into a single size distribution.

All of these steps, other than the initial identification of the gas bubbles, can conveniently be performed automatically on a computer, for example by using software such as MATLAB R2006a (MathWorks, Inc) software.

Identification and Sizing of the Individual Gas Bubbles in the Micrographs

Firstly, a trained operator (i.e. one familiar with the microstructures of aerated systems) traces the outlines of the gas bubbles in the digital SEM images using a graphical user interface. The trained operator is able to distinguish gas bubbles from ice crystals (which are present in frozen aerated products and are the same order of magnitude in size) because the gas bubbles are approximately spherical objects of varying brightness/darkness whereas ice crystals are irregular-shaped objects of a uniform grey appearance.

Secondly, the size is calculated from the selected outline by measuring the maximum area as seen in the two dimensional cross-sectional view of the micrograph (A) as defined by the operator and multiplying this by a scaling factor defined by the microscope magnification. The bubble diameter is defined as the equivalent circular diameter d:

$$d = 2\sqrt{A/\pi}$$

This is an exact definition of the diameter of the two-dimensional cross-section through a perfect sphere. Since most of the gas bubbles are approximately spherical, this is a good measure of the size.

Extraction of the Size Information from Each Micrograph

Gas bubbles which touch the border of a micrograph are only partially visible. Since it is not therefore possible to determine their area, they must be excluded. However, in doing so, systematic errors are introduced: (i) the number of gas bubbles per unit area is underestimated; and (ii) large gas bubbles are rejected relatively more often since they are more likely to touch the border, thus skewing the size distribution. To avoid these errors, a guard frame is introduced (as described in John C. Russ, "The Image Processing Handbook", $2^{nd}$ edition, CRC Press, 1995). The guard frame concept uses a virtual border to define an inner zone inside the micrograph. The inner zone forms the measurement area from which unbiased size information is obtained, as illustrated in FIG. 1 (a schematic depiction of a micrograph, in which gas bubbles that touch the outer border of the micrograph have been drawn in full, even though in reality only the part falling within the actual micrograph would be observed.)

Bubbles are classified into 5 classes depending on their size and position in the micrograph. Bubbles that fall fully within the inner zone (labelled class 1) are included. Bubbles that touch the border of the virtual micrograph (class 2) are also included (since it is only a virtual border, there is fact full knowledge of these bubbles). Bubbles that touch the actual micrograph border (class 3) and/or fall within the outer zone (class 4) are excluded. The exclusion of the class 3 bubbles introduces a bias, but this is compensated for by including the bubbles in class 2, resulting in an unbiased estimate of the size distribution. Very large bubbles, i.e. those larger than the width of the outer zone (class 5), can straddle both the virtual (inner) border and the actual outer border and must therefore be excluded, again introducing bias. However, this bias only exists for bubbles that are wider than the outer zone, so it can be avoided by excluding all bubbles of at least this size (regardless of whether or not they cross the actual border). This effectively sets an upper limit to the gas bubble size that can be reliably measured in a particular micrograph. The width of the inner zone is chosen to be 10% of the vertical height of the micrograph as a trade-off between the largest bubble that can be sized (at the resolution of the particular micrograph) and the image area that is effectively thrown away (the outer zone).

There is also minimum size limit (at the resolution of the micrograph) below which the operator cannot reliably trace round gas bubbles. Therefore bubbles that are smaller than a diameter of 20 pixels are also ignored.

Combination of the Data from the Micrographs into a Single Size Distribution

As explained above, it is necessary to introduce maximum and minimum cut-off bubbles sizes. In order that these minimum and maximum sizes are sufficiently small and large respectively so as not to exclude a significant number of bubbles, samples are imaged at 3 different magnifications: 100×, 300× and 1000×. Each magnification yields size information in a different range, given in Table 3.

TABLE 3

| Magnification | Minimum bubble size | Maximum bubble size |
|---|---|---|
| 100× | 20 μm | 83 μm |
| 300× | 6.6 μm | 28 μm |
| 1000× | 2.0 μm | 8.3 μm |

Thus bubbles as small as 2 μm and as large as 83 μm are counted. Visual inspection of the micrographs at high and low magnifications respectively confirmed that essentially all of the bubbles fell within this size range. The magnifications are chosen so that there is overlap between the size ranges of the different magnifications (e.g. gas bubbles with a size of 20-28 μm are covered by both the 100× and 300× micrographs) to ensure that there are no gaps between the size ranges. In order to obtain robust data, at least 500 bubbles are sized; this can typically be achieved by analysing one micrograph at 100×, one or two at ×300 and two to four at ×1000 for each sample.

The size information from the micrographs at different magnifications is finally combined into a single size distribution histogram. Bubbles with a diameter between 20 μm and 28 μm are obtained from both the 100× and 300× micrographs, whereas the bubbles with a diameter greater than 28 μm are extracted only from the 100× micrographs. Double counting of bubbles in the overlapping size ranges is avoided by taking account of the total area that was used to obtain the size information in each of the size ranges (which depends on the magnification), i.e. it is the number of bubbles of a certain size per unit area that is counted. This is expressed mathematically, using the following parameters:

N=total number of gas cells obtained in the micrographs
$d_k$=the $k^{th}$ outlined gas cell with $k \in [1, N]$
$A_i$=the area of the inner zone in the $i^{th}$ micrograph
$R_i$=the range of diameters covered by the $i^{th}$ micrograph (e.g. [20 μm, 83 μm])
B(j)=the $j^{th}$ bin covering the diameter range: [jW, (j+1)W]

The total area, S(d), used to count gas bubbles with diameter d is given by adding the areas of the inner zones (A) in the micrographs for which d is within their size range ($R_i$).

$$S(d) = \sum_{i | d \in R_i} A_i$$

The final size distribution is obtained by constructing a histogram consisting of bins of width W μm. B(j) is the number of bubbles per unit area in the $j^{th}$ bin (i.e. in the diameter range j×W to (j+1)×W). B(j) is obtained by adding up all the individual contributions of the gas bubbles with a diameter in the diameter range j×W to (j+1)×W, with the appropriate weight, i.e. 1/S(d).

$$B(j) = \sum_{k \in D} 1/S(d_k)$$

where $$D_j = \{k | d_k \in [jW, (j+1)W]\}$$

The bubble size distributions are conveniently described in terms of the normalised cumulative frequency, i.e. the total number of bubbles with diameter up to a given size, expressed as a percentage of the total number of bubbles measured.

Results

The normalised cumulative frequency at bubble diameters of 20 and 10 μm for products A and B are summarised in Table 4. The sizes of 20 and 10 μm are chosen since they are substantially smaller than the mean gas bubble size in conventional frozen aerated confections (typically around 50 μm), so a product which contains a significant number of gas bubbles below 20 or 10 μm contains a large number of small bubbles in comparison to a standard product.

TABLE 4

| Product | % bubbles <20 μm | % bubbles <10 μm | Measured free β-casein/ Total β-casein (%) |
|---|---|---|---|
| A | 0.99 | 0.97 | 55 |
| B | 0 | 0 | 40 |

The number of bubbles with diameter less than 20 μm depends on the ratio of free β-casein to total β-casein. For a free β-casein:total β-casein ratio below 45% (product B) there are very few small bubbles, whereas above this ratio (product A) there is a significant number of small bubbles.

The various features and embodiments of the present invention, referred to in individual sections above apply, as appropriate, to other sections, mutatis mutandis. Consequently features specified in one section may be combined with features specified in other sections, as appropriate. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. A frozen aerated confection comprising at least 0.2 wt % free β-casein, wherein the free β-casein constitutes more than 45% of the total β-casein present in the frozen confection; and containing a population of gas bubbles, wherein at least 65% of the gas bubbles have a diameter of less than 20 μm.

2. A frozen aerated confection according to claim 1 wherein at least 50% of the gas bubbles have a diameter of less than 10 μm.

3. A frozen aerated confection according to claim 1 wherein the amount of free β-casein is at least 0.5 wt %.

4. A frozen aerated confection according to claim 1 wherein the free β-casein constitutes at least 50% of the total β-casein present in the frozen confection.

5. A frozen aerated confection according to claim 1 which has an overrun of from 20% to 400%.

6. A frozen aerated confection according to claim 1 which is an ice cream, sorbet and frozen yoghurt.

7. A process for producing an aerated food product, the process comprising:
 a) providing a mixture of ingredients comprising at least 0.2 wt % free β-casein, wherein the free β-casein constitutes more than 45% of the total β-casein present in the frozen confection;
 b) aerating the mixture so that a population of gas bubbles is formed, wherein at least 65% of the gas bubbles have a diameter of less than 20 μm;
 c) freezing the mixture;
wherein steps b) and c) may take place simultaneously or in either order.

8. A process according to claim 7 wherein the mixture of ingredients comprises an isolated, purified or partially purified, enriched or concentrated source of β-casein.

* * * * *